Oct. 27, 1942.     F. G. LOGAN     2,299,911
MOTOR STARTING APPARATUS
Filed Aug. 16, 1939
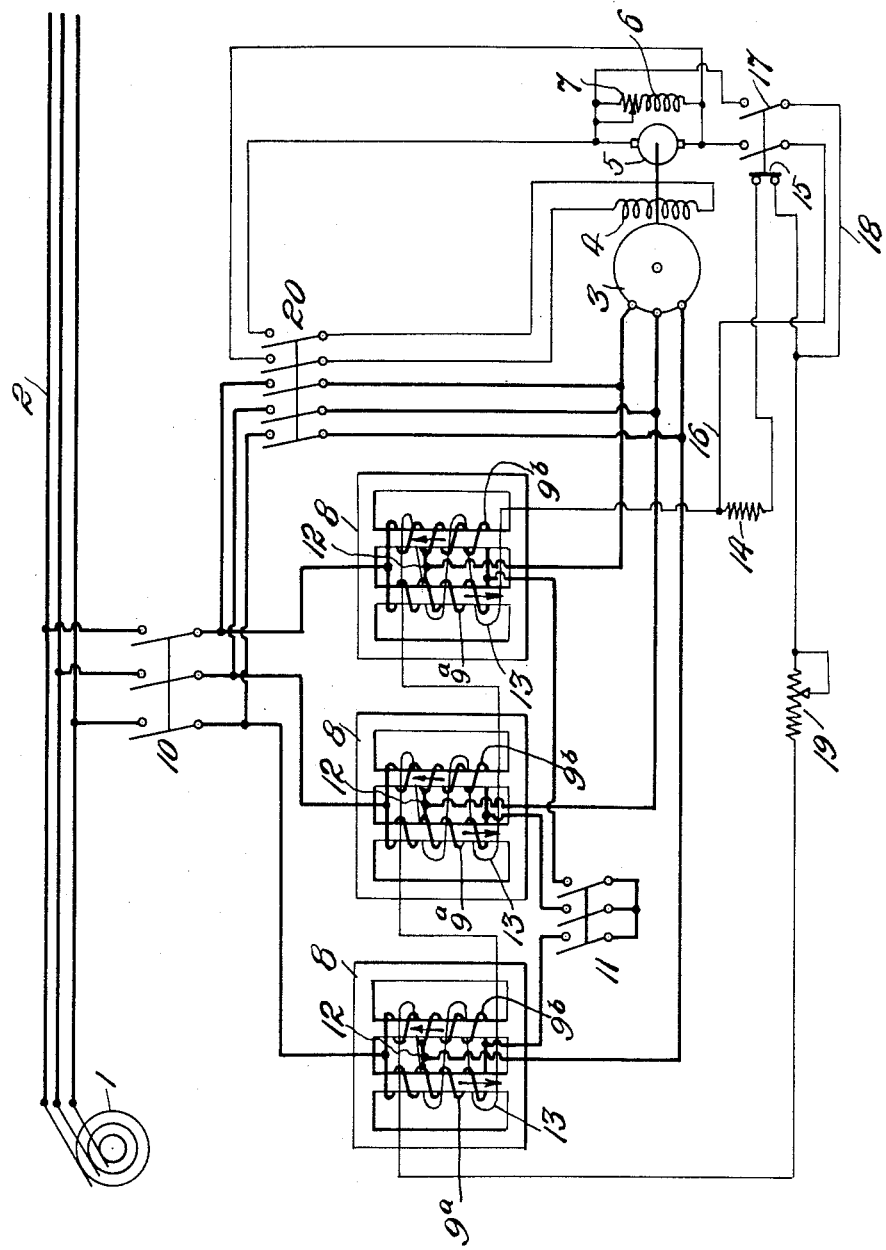
INVENTOR
*FRANK G. LOGAN*
BY
*Lawrence K. Sager*
his ATTORNEY Patented Oct. 27, 1942

2,299,911

UNITED STATES PATENT OFFICE 2,299,911

MOTOR STARTING APPARATUS

Frank G. Logan, Mount Vernon, N. Y., assignor to Ward Leonard Electric Company, a corporation of New York Application August 16, 1939, Serial No. 290,361

2 Claims. (Cl. 172—289)

This invention is particularly applicable to the starting of synchronous motors.

A commonly used method of starting motors is by connecting the motor successively to taps of an auto-transformer. This has the disadvantage of opening the motor circuit in passing from the first starting tap through the successive tap connections which results in a heavy rush of current from the line and objectionable disturbance of line conditions, not only on account of the heavy starting currents but also due to the transient current effects on the line. The objectionable starting effects are further aggravated in passing from the first step through successive steps by the fact that the counter-volts of the motor may be out of phase with the line voltage when the circuit is closed in passing through the successive steps. These conditions are particularly objectionable in starting motors of large capacity, especially when the conditions require starting the motors under load. Such a mode of starting also requires the use of starting switches or circuit breakers of large capacity to properly carry the heavy starting currents.

The main object of the present invention is to provide an improved apparatus and method of starting motors where the conditions require comparatively low starting line currents and a minimum disturbance of line conditions, and particularly where the motors are of comparatively large capacity and where it is necessary to start the motors under load. Another object is to provide a high motor torque in bringing the motor up to speed and with a minimum disturbance of line conditions. Another object is to avoid opening the motor circuit in bringing the motor up to speed and to obtain a gradual increase in speed without subjecting the motor and load to abrupt changes. Another object is to enable the motor to be brought close to synchronous or running speed before connecting the motor directly to line. Another object is to provide apparatus of a character which will be durable and dependable over long periods without the necessity of frequent inspection or renewal of the parts. Other objects and advantages will be understood from the following description and accompanying drawing.

The invention is based upon the use of starting apparatus which first acts as an auto-transformer and then as a controlled reactor with provision for changing its reactance while increasing the motor speed. A further feature is causing the reactance to be changed automatically as the motor speed increases.

The accompanying drawing is a diagram showing an embodiment of the invention applied to the starting of a three-phase synchronous motor, although the invention is applicable to other types and to the use of any number of phases as will be understood from the following description of this particular application.

The drawing shows a three-phase source 1 supplying a three-phase line 2. The synchronous motor is shown having a rotor 3 and a field winding 4. The motor is shown as driving its direct current exciter which has an armature 5 and a field winding 6 connected in shunt to the armature through an adjustable rheostat 7.

Three auto-transformers which also serve as controlling reactors are shown, one for each phase, and as having four legged cores 8. Each of the two inner legs of these cores are shown having windings 9a and 9b and the windings of each pair are shown connected in parallel and the common terminal of each pair is connected to its respective supply line through a three-phase switch or circuit breaker 10. The other terminals of each pair of windings are connected respectively to a three-pole switch 11 which, when closed, serves to connect the windings to a common neutral point. These windings serve both as the auto-transformer and reactance windings. The windings 9a and 9b of each pair are wound on their respective cores in such direction that the fluxes created thereby are in opposite directions in the two inner legs, as indicated by the arrows on the two inner legs of each core. A tap 12 is provided at each winding of each pair and a common connection therefrom extends respectively to the three-phase terminals of the motor. These taps may be at any selected points of the windings according to conditions and would commonly be within a range of 50% to 80% from the neutral to the taps and usually should be about the same in each of the three pairs.

An additional controlling winding 13 is provided for each core which envelops both of the inner legs of each core and likewise envelops the windings 9a and 9b. The windings 13 are shown connected in series with each other through a discharge resistance device 14 and through a switch 15. A lead 16 from one terminal of the windings 13 is connected to a movable contact of a switch 17 while a lead 18 from the other terminal of the windings 13 is connected to another movable contact of the switch 17. An adjustable rheostat 19 is connected in the circuit of the windings 13.

The switches 15 and 17 are arranged so that when the switch 15 is closed, as shown in the drawing, the switch 17 is open; and movement of the switch 17 to its closed position will cause the opening of switch 15. One fixed contact of the switch 17 is connected to one terminal of the exciter 5 while the other fixed contact is connected to the other terminal of the exciter. A switch 20 is shown as having five poles and when this switch is closed it connects the motor terminals by three elements of the switch directly to the incoming lines at the inside of switch 10. The other two elements of the switch 20 when in closed position, connect the field winding 4 of the motor to the terminals of the exciter 5.

The drawing shows the parts in position when the motor is at rest. In starting, the first step is to close the switch 11 which connects the terminals of the transformer windings to a common neutral point. The next step is to close the switch 10 which connects the transformer windings to the supply line and causes them to function as auto-transformer windings. The motor now starts as an induction motor and is subjected to a voltage corresponding to the selected position of the taps 12. The motor starts and increases to a speed dependent upon the position of the taps 12. During this period of starting the control windings 13 are inactive and are not subjected to any appreciable induced currents because the flux within the control windings 13 created by the transformer windings is in opposite directions within each of the control windings which, as already explained, is indicated by the arrows on the inner legs of the cores. At this time the control windings are connected in a closed circuit on themselves through the discharge resistance 14 and switch 15.

The next step is to open the switch 11 and close the switch 17. This opens the neutral connection of the auto-transformer windings and opens the circuit of the control windings by the opening of switch 15 when switch 17 is closed; and the closing of switch 17 causes the control windings to be subjected to the voltage of the exciter 5. A portion of the windings 9a and 9b now serve as reactive windings in series with the respective leads to the motor, the circuit in each phase being from the line through switch 10, through the upper portions of the windings 9a and 9b to the taps 12 and thence to the motor terminals. Current is now supplied to the control windings 13 which is dependent upon the speed of the motor and exciter 5 and this current at first is comparatively low because the motor and exciter are running considerably below full speed. The reactance of that portion of the windings 9a and 9b now in series with the motor is at first comparatively high owing to the small value of current in the control windings. Consequently in passing from the auto-transformer starting connection to the reactive control condition the speed of the motor will be increased without any abrupt change or shock because the voltage applied to the motor terminals is considerably reduced by the reactance of that portion of the windings 9a and 9b which are in circuit with the motor. The reactance of these windings is made such as to secure some increase in speed in passing from the auto-transformer control to the reactive control and as the current builds up and increases in the control windings 13 by reason of the increase in speed of the motor and of the exciter, the reactance of the windings 9a and 9b gradually decreases which permits a gradually increasing voltage to be automatically applied to the motor terminals. This automatic control continues as the motor approaches synchronous speed and when the motor reaches synchronous speed, the exciter is delivering its maximum current to the control windings 13 resulting in the reactance of the windings 9a and 9b being comparatively small. This permits the voltage applied to the motor to be a close approach to the full line voltage and permits the motor to exert high torque at this speed so that in passing to the condition when the motor operates as a synchronous motor, the change is smoothly accomplished. Furthermore the control of the reactance during the increase in speed results in keeping the starting current at a minimum and the starting torque at a maximum with a minimum of disturbance to the line conditions as regards both transient and steady state conditions. The reactive control may be adjusted to that desired by the rheostat 19 in the circuit of the control windings or by adjustment of the rheostat 7 in the field of the exciter.

In passing to running conditions the switch 17 is opened, closing the switch 15, and the switch 20 is closed. This connects the motor directly to line and also connects the field winding of the motor to the exciter. The motor then continues to operate at synchronous speed under running conditions. That portion of the windings 9a and 9b which was used during the reactive control is short-circuited by the closing of switch 20; and the control windings 13 are closed on themselves through the discharge resistor 14. It will be noted that at no time throughout the starting period is the motor circuit open.

It will be understood that the swiches or circuit breakers used in conjunction with the motor and starting apparatus may be electrically operated and may be related by the provision of suitable interlocking means in the usual manner for securing the proper sequence of control in starting the motor.

Although a particular embodiment of the invention has been described, various modifications may be made therein and various applications and uses of the invention may be made as required for particular conditions without departing from the scope of the invention.

I claim:

1. The combination with a synchronous motor of starting means therefor comprising an auto-transformer having a tap, means for energizing the motor from a source of alternating current through the auto-transformer, means for changing the auto-transformer to a reactor for increasing the speed of the motor, a control winding for changing the reactance of the reactor, a direct current exciter driven by said motor, means for supplying a gradually increasing current from said exciter to said control winding when said transformer is used as a reactor and thereby further and gradually increasing the speed of the motor, and means for disconnecting said control winding from said exciter and for connecting the field winding of said motor to said exciter in passing to running conditions.

2. The combination with a synchronous motor of starting means therefor comprising an auto-transformer having a tap, means for energizing the motor from a source of alternating current through the auto-transformer, means for changing the auto-transformer to a reactor for increasing the speed of the motor, a control winding for changing the reactance of the reactor, a direct current exciter driven by said motor, means for supplying a gradually increasing current from said exciter to said control winding when said transformer is used as a reactor and thereby further and gradually increasing the speed of the motor, and means for disconnecting said control winding from said exciter and placing said control winding in a closed local circuit and for connecting the field winding of said motor to said excited in passing to running conditions.

FRANK G. LOGAN.